US008198521B2

(12) United States Patent
Bouchard et al.

(10) Patent No.: US 8,198,521 B2
(45) Date of Patent: Jun. 12, 2012

(54) PROPORTIONAL ELECTROMAGNET ACTUATOR AND CONTROL SYSTEM

(75) Inventors: Mathieu Bouchard, Montreal (CA); Stéphan Boivin, Blainville (CA); André Chénier, Beloeil (CA); Pierre Pelletier, Boucherville (CA)

(73) Assignee: Novelorg Inc., Longueuil (CA)

( * ) Notice: Subject to any disclaimer, the term of this patent is extended or adjusted under 35 U.S.C. 154(b) by 0 days.

(21) Appl. No.: 12/794,025

(22) Filed: Jun. 4, 2010

(65) Prior Publication Data

US 2010/0236377 A1 Sep. 23, 2010

Related U.S. Application Data

(60) Division of application No. 11/694,184, filed on Mar. 30, 2007, now Pat. No. 7,754,952, which is a continuation of application No. PCT/CA2005/001521, filed on Sep. 30, 2005.

(60) Provisional application No. 60/614,463, filed on Oct. 1, 2004.

(51) Int. Cl.

| | |
|---|---|
| ***G10F 1/02*** | (2006.01) |
| ***G10B 3/10*** | (2006.01) |
| ***G10H 1/24*** | (2006.01) |
| ***G10H 1/02*** | (2006.01) |
| ***G01P 3/00*** | (2006.01) |

(52) U.S. Cl. .................. 84/21; 84/337; 84/626; 84/620

(58) Field of Classification Search .................... 84/337, 84/341, 626, 620, 21

See application file for complete search history.

*Primary Examiner* — Elvin G Enad

*Assistant Examiner* — Andrew R Millikin

(74) *Attorney, Agent, or Firm* — Norton Rose Canada LLP

(57) ABSTRACT

The invention provides an actuator for actuating a pallet of a pipe organ under the command of a key of an organ. The actuator comprises a movable member, adapted to be connected to the pallet of the organ pipe and a magnetic plunger, mounted on the movable member. It also comprises an electromagnet having a gap within which the magnetic plunger can be inserted and moved, wherein the electromagnet when energized moves the member to thereby actuate the pallet. A controller unit controls a current in the electromagnet to provide a controlled actuation of the pallet that is proportional to a key dip of the key. It also provides for a system based on a digital serial link for controlling an assembly of organ pallets that are actuated by electromagnets.

10 Claims, 8 Drawing Sheets

PROPORTIONAL ELECTROMAGNET ACTUATOR AND CONTROL SYSTEM

RELATED APPLICATION

This application is a divisional of U.S. patent application Ser. No. 11/694,184 filed Mar. 30, 2007, which is a continuation under 35 USC §120 of International patent application no. PCT/CA2005/001521 filed Sep. 30, 2005 entitled PROPORTIONAL ELECTROMAGNET ACTUATOR AND CONTROL SYSTEM, which claims priority of U.S. provisional patent application No. 60/614,463 filed Oct. 1, 2004 entitled PROPORTIONAL ELECTROMAGNET ACTUATOR AND CONTROL SYSTEM under 35 USC §119(e), the specifications of which are hereby incorporated by reference.

FIELD OF THE INVENTION

The invention relates to field of electromagnet actuators, particularly to those used in pipe organs.

BACKGROUND OF THE ART

Pipe organs can be very large instruments with thousands of pipes. Usually, each organ pipe is equipped with a pallet which closes and opens the pipe to the passage of air therethrough. When the pallet is opened, the air flow can enter the pipe and as a result a sound is produced. The pallet is opened when the organist presses the corresponding key on the organ keyboard.

Modern pipe organs use electromagnets to open a pallet when the corresponding key is pressed: pressing a key sends a current to the solenoid of the electromagnet that pulls open a moveable armature of the electromagnet. Since the armature is connected to the pallet, moving the armature causes the pallet to open. In order to control the assembly of the electromagnets that actuate the numerous pallets, an electric control system is also a part of the organ as a whole. Because of the numerous pallets an organ can have, current control systems can be however quite cumbersome.

Current electromagnet systems used for controlling the closing and opening of pallets function according to an ON/OFF principle, i.e. the pallet is either opened or closed. Pipe organs containing such electromagnet systems are therefore insensitive to the subtlety and intensity of an organist's touch to the keys.

SUMMARY OF THE INVENTION

In one of its aspects, the present invention provides an electromagnet actuator that presents a mechanical structure that is stable and, at the same time, compact enough such that many of these electromagnets can be stacked to control hundreds of pipes. The present invention also provides for a system to control these electromagnet actuators such that each of these electromagnet actuators can provide an opening of a pallet that is proportional to the key dip of the corresponding key that was pressed by the organist. The present invention also provides an efficient and simple control system based on a digital serial link.

The invention provides an actuator for actuating a pallet of an organ pipe under the command of a key of an organ. The actuator comprises a movable member adapted to be connected to the pallet of the organ pipe; a magnetic plunger, mounted on the movable member; an electromagnet having a gap defined therein for receiving the magnetic plunger when energized, the gap comprising a space between a magnetic north pole and a magnetic south pole of the electromagnet formed when the electromagnet is energized; and a controller unit to control a current in the electromagnet to provide a controlled actuation of the pallet, proportional to a key dip of the key. When the electromagnet is energized with the current, a magnetic field is created between the magnetic north pole and the magnetic south pole of the electromagnet, exerting a force over the magnetic plunger and thereby moving the member to actuate the pallet of the organ pipe.

Advantageously, the electromagnet and the magnetic plunger of the actuator have similar cross-sections, to provide for a low reluctance magnetic circuit, the magnetic circuit being created when the electromagnet is energized.

Advantageously, the movable member comprises an arm pivotally mounted on the electromagnet and comprises low permeable material such as to be substantially external to the magnetic circuit.

Advantageously, the actuator further comprises a controller unit to control a current in the electromagnet to provide a controlled actuation of the pallet.

The invention further provides a controllable actuator for actuating a pallet of an organ pipe under the command of a key of an organ. The actuator comprises a movable member having a magnetic plunger and an electromagnet having a gap within which the magnetic plunger can be inserted and moved. The electromagnet further has a core comprising at least two parallel portions, and at least two coils respectively wound around the parallel portion, whereby each coils produces partial magnetic field which are added to contribute to a total magnetic field of the electromagnet and thereby control the movement of the magnetic plunger and hence of the member, wherein the electromagnet when energized moves the member to thereby actuate the pallet of the organ pipe.

The invention further provides a system for controlling an assembly of pallets in an organ, wherein each pallet is actuated by an electromagnet actuator and corresponds to a key of the organ. The system comprises a plurality of key dip measurement units for measuring for each of the keys a dip as a function of time and for providing a plurality of digital key dip statuses. It also comprises a plurality of controllers, wherein each controller is connected to one of the electromagnet actuators. It also comprises a communication unit for receiving the digital key dip statuses and relaying each of the statuses to the corresponding controller via a serial link, wherein the controllers control the electromagnet actuators upon receiving the digital key statuses to thereby provide for each pipe an opening proportional to the corresponding key dip.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

Figure 1:
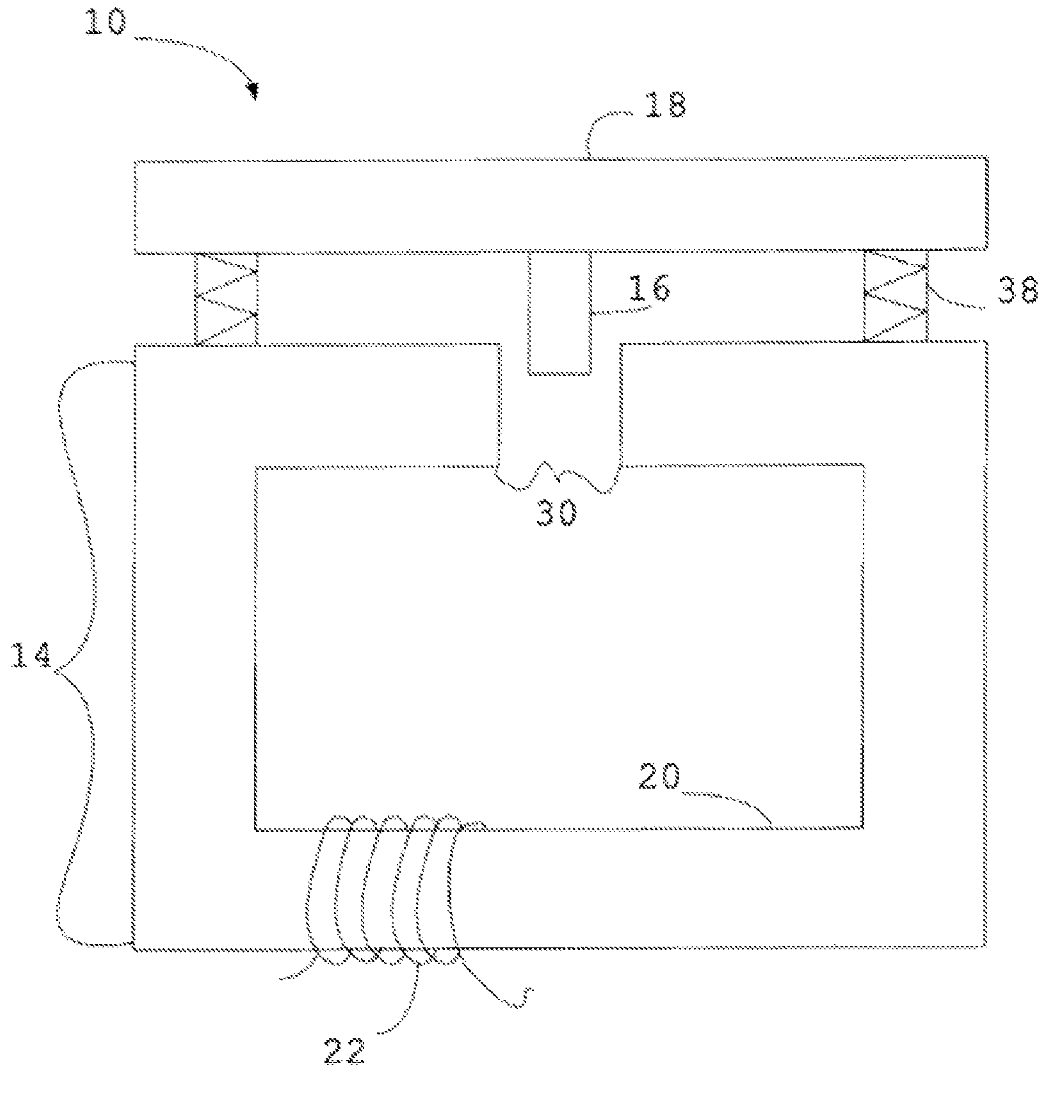
FIG. 1 is a schematic view of an electromagnet actuator to open a pallet in accordance with a one embodiment of the present invention.

FIG. 1 illustrates schematically an electromagnetic actuator 10 in accordance with one embodiment of the present invention and its relation with an organ pallet (not shown). The electromagnet actuator 10 comprises an electromagnet 14, a magnetic plunger 16 and a member 18. In one embodiment of the present invention, the electromagnetic actuator 10 also comprises biasing means to apply a force on the member 18 to keep it normally in an upper position (when the electromagnet 14 is not energized). In FIG. 1, such biasing means is a spring 38, imparting a vertically upward force to the member 18 and thereby helping to keep the pallet closed. The electromagnet 14 comprises a magnetic core 20, which can have various shapes and usually made of soft iron, at least one coil 22 for creating a magnetic flux in the electromagnet 14, and a gap 30 defined therein. The plunger 16, made of a permeable material, is attached to the member 18 and has dimensions such that it can fit inside the gap 30 of the electromagnet 14 while leaving a desired amount of space on either side of plunger 16. Therefore, when the electromagnet 14 is energized (by having a current flowing through the coil 22), a magnetic induction is produced inside the magnetic core 20, and in the plunger 16 and the gap 30, creating a magnetic field, whose lines follow roughly the geometry of the core 20 in order to reduce the gap 30 and produce vertical downward movement. The magnetic field defined through the gap 30 exerts a vertically downward attraction force over the magnetic plunger 16, such that the plunger 16 and the member 18 to which it is attached will be moved towards the gap 30. If the member 18 is attached by a connector (not shown) to the pallet, the member 18 moving towards the electromagnet 14 will provide an opening of the pallet. When the current of the electromagnet 14 is shut down, the member 18 is brought back to its upper position by means of the spring 38 retaining force, which helps to keep the organ pallet closed.

While FIG. 1 illustrates very schematically the principles of the electromagnet actuator 10, it will become apparent to one skilled in the art that many other geometries of the core 20, of the member 18, of the plunger 16 and of the physical relationships between these elements are possible and are intended to be covered by the present invention.

In an alternative embodiment, for example, the magnetic core 20 can lack the symmetrical geometry of the core 20 illustrated in FIG. 1. Similarly, the gap 30 defined in the core may by placed elsewhere in the magnetic field defined by the magnetic core 20. Similarly, more than one coil 22 can be part of the electromagnet 14 or the coil 22 may be disposed differently with respect to the magnetic core 20. In short, many configurations of the electromagnet 14 can be realized, without departing from the scope of the present invention.

Figure 2:
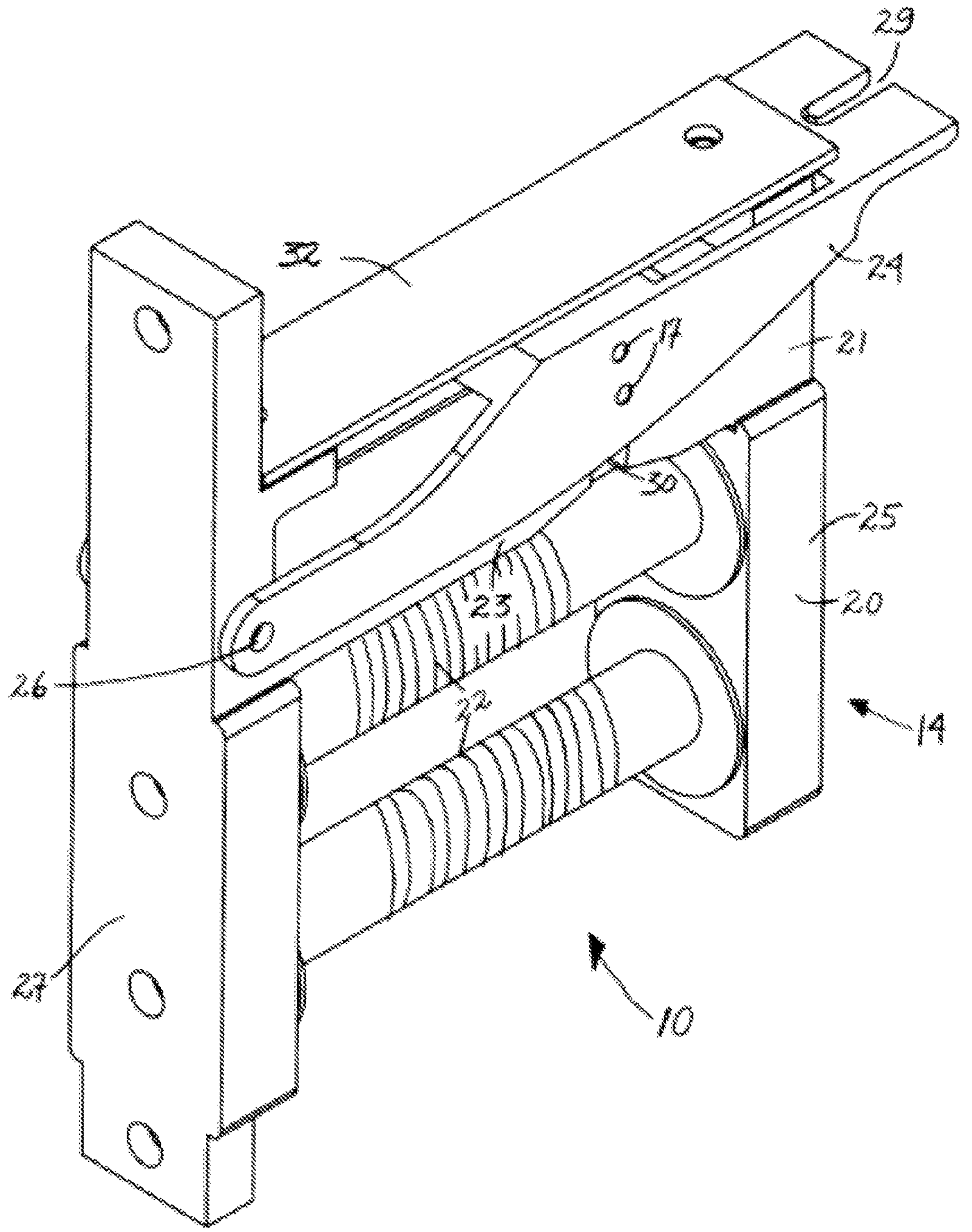
FIG. 2 is a perspective view of the electromagnet actuator of FIG. 1, when the member is a pivotal arm and shown without the coils.
Figure 3:
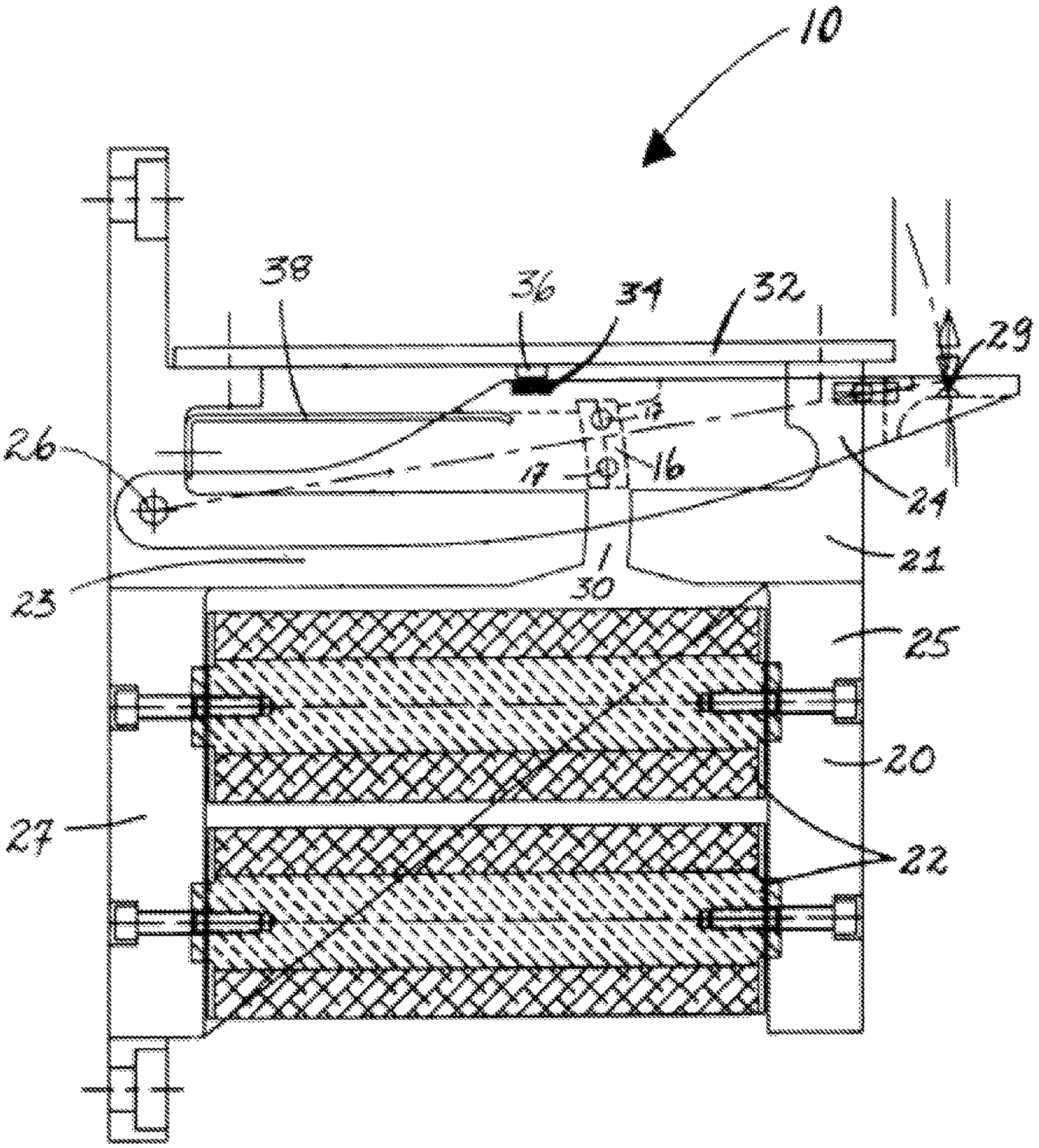
FIG. 3 is a cross-section view of the electromagnet actuator of FIG. 2, with the arm in the upper position.
Figure 4:
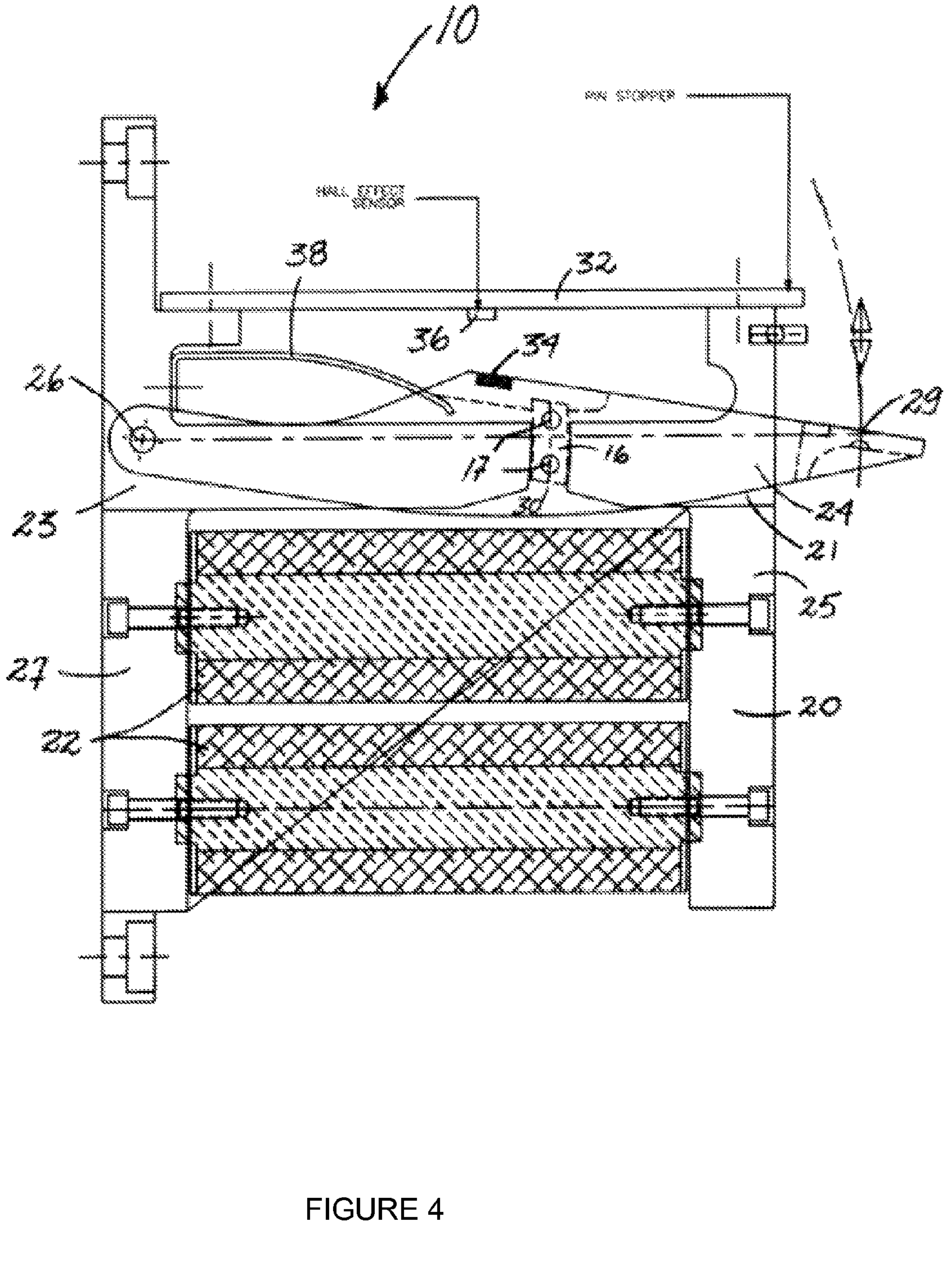
FIG. 4 is a cross-section view of the electromagnet actuator of FIG. 2, with the arm in the lower position.

One of these configurations is shown in FIGS. 2, 3 and 4 in which an electromagnet actuator 10 having as a member 16 a pivotal arm 24 is illustrated with a pair of coils 22. The arm 24 comprises a connecting point 29 to which a connector linked to the pallet (not shown) is affixed. The arm 24 is mounted to the core structure 20 by means of a pivot 26. Hidden inside the arm 24, is the plunger 16 which is located just behind the two screw holes 17, just at the level of the core gap 30. FIG. 2 illustrates the structure of the electromagnet 10 that was made to receive two coils 22 producing parallel magnetic fluxes. The two coils 22 are shown on two separate and parallel legs of the core. The two coils 22 are electrically connected such that when they are energized, they produce magnetic fields that add up in the core 20. To increase the magnetic field inside the core 20, more parallel legs (also referred to herein as parallel portions) with coils can be added to the two existing coils. Thus, in this geometry, the magnetic flux flows around the core from the two coils 22, to the core's left part 27, then to the left top part 23, and then traverses the plunger 16 and the gap 30 to flow in the right top part 21 to the core's right part 25 to finally close the magnetic circuit. It can be noted that one advantage of the present structure is that substantially no magnetic flux flows through the arm 24. The arm is not therefore part of the magnetic circuit which enables to reduce the reluctance of the electromagnet 14. It can also be noted that one particularity of this electromagnet 14 is having a magnetic core cross-section that is relatively constant along the magnetic circuit, (including the magnetic plunger 16), which is another way to reduce the reluctance of the actuator 10.

In this particular embodiment, since the arm 24 does not have to be made out of a permeable material, as it is not part of the magnetic circuit of the electromagnet 14, a polymer material may be used for the arm 24. That provides a very light arm 24, easier to pivot than a metallic arm, such as those that can be found in prior art systems.

A PCB plate 32 can also be seen on the top of the actuator 10 structure, which is just above the arm 24. This PCB plate 32 is equipped with a Hall effect sensor 36 (FIGS. 3 and 4) that measures the position of the arm 24 by detecting the position of a permanent magnet 34 located on the arm 24. The PCB plate 32 also has the role of controlling the coil current as a function of position in time in order to provide an opening of the pallet that is proportional to the key dip of the key when pressed by the organist.

FIG. 3 illustrates the actuator 10 when the arm 24 is in an upper position and FIG. 4 illustrates the actuator 10 when the arm 24 is in the lower position. The arm 24 is in an upper position when the electromagnet 14 is not energized and the pallet to which it is connected is closed. It is understood that, in the upper position, the plunger 16 must be slightly engaged in the gap 30. The arm 24 is in a lower position when the electromagnet 14 is energized, and in that case, the pallet to which it is connected is completely open. Naturally, PCB 32 can control the opening of the arm 24 (and of the pallet) to an intermediate position corresponding to an intermediate key dip. As it can be seen, the plunger 16 (illustrated by dashed lines) is almost completely in the gap 30 when the arm 24 is in the lower position such that it fills almost totally the gap space.

Thus, the present invention provides for an electromagnet actuator 10 that can deliver sufficient work to open the pallet pipe and at the same time be compact, thanks to its dual coil geometry and its low reluctance. The present invention provides also for an electromagnet actuator 10 that presents a very stable structure that is less susceptible to deformation created by very high magnetic flux.

Figure 5:
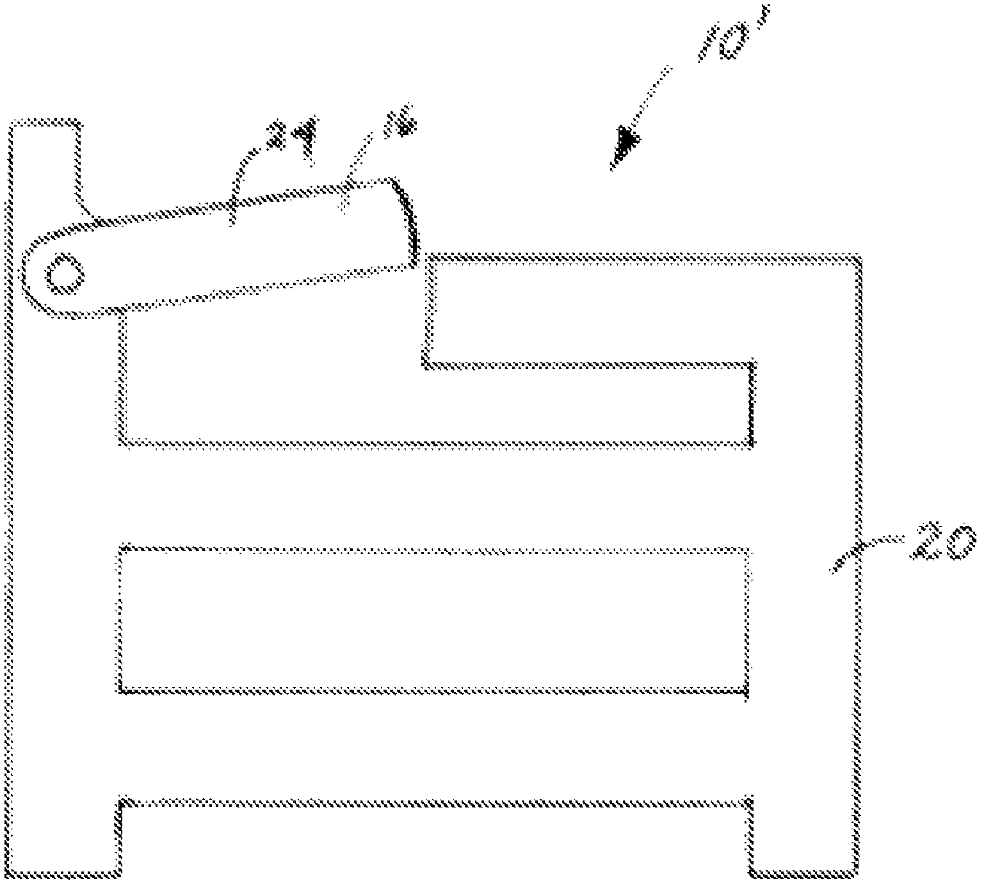
FIG. 5 is a schematic view of an electromagnet actuator to open a pallet in accordance with an alternative embodiment.

Naturally, other electromagnet actuators configurations than the one just described, could be thought of, having an equivalent compact and stable structure and without loosing potential in delivering work. An example of another configuration 10' having such characteristics is illustrated in FIG. 5, where the pivotally arm 24 is shorter and is made of highly permeable material. In that configuration, the plunger 16 and the arm 24 are corresponding to the same entity and the arm 24 is part of the magnetic circuit. Because the cross-section of the arm 24 is substantially the same as the cross-section of the core 20 the reluctance of the magnet can be kept low. The dual coil configuration allows keeping the electromagnet actuator 10' compact without sacrificing on the deliverable work to open the pallet valve.

Figure 6:
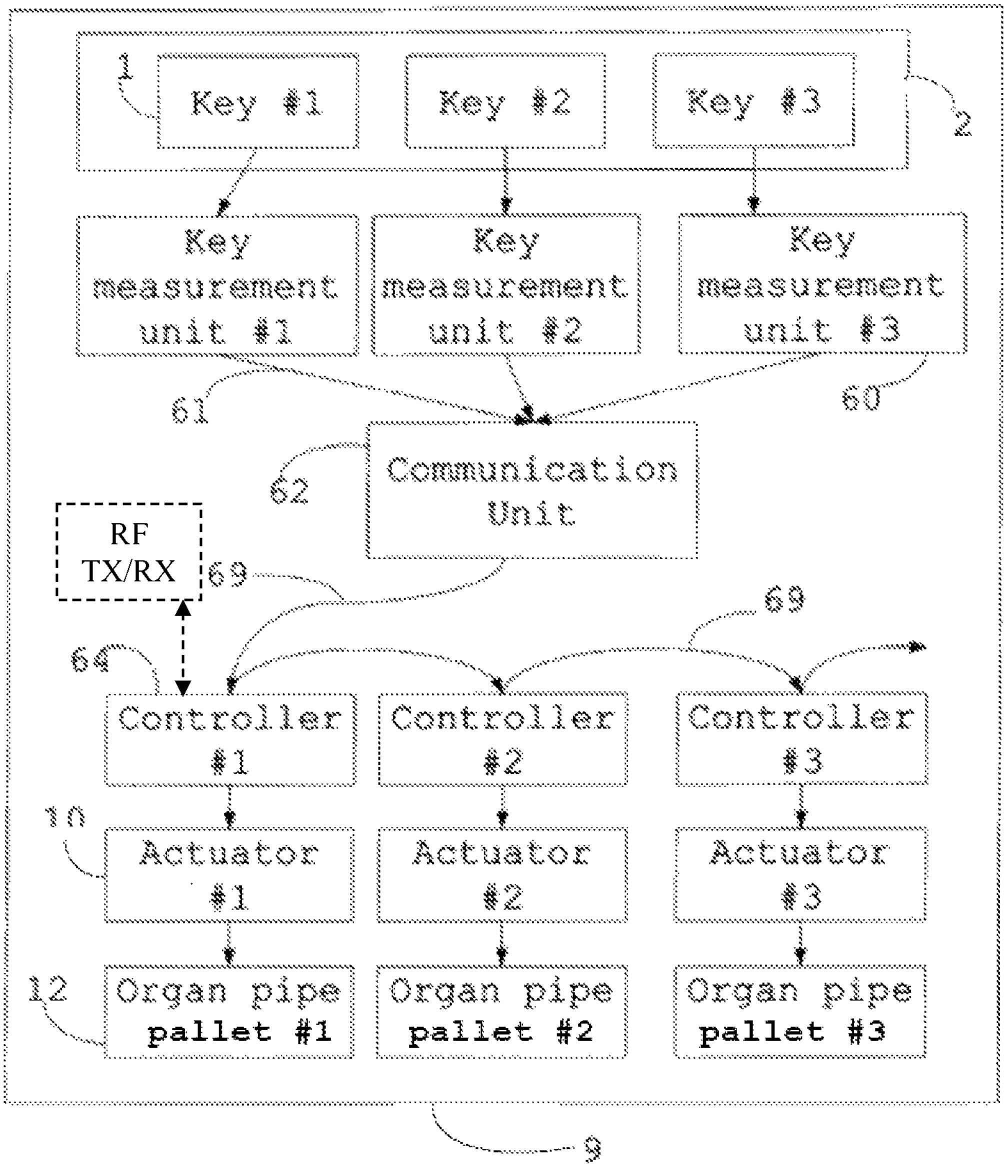
FIG. 6 is a block diagram of a system to control an organ in accordance with one embodiment of the present invention

Turning now to FIG. 6, the architecture of a system for controlling an organ will be described. For simplicity, only three keys 1 of the organ are schematically illustrated with their accompanying control elements, but obviously, the system 9 can be generalized for the whole assembly of keys 1 of the organ. The system 9 measures, as a function of time, with key measurement units 60, the key dip of the keys 1 of an organ keyboard 2. In this embodiment, each key 1 is equipped with its own key dip measurement unit 60. The unit 60 then converts the analog key dip signal to a digital signal, referred to as a digital key dip status 61. This digital key dip status 61 is then relayed to a communication unit 62 that manages the input/output of the system 9. In particular, communication unit 62 relays to each controller 64 of each electromagnet actuator (and eventually to each electromagnet actuator PCB 32), the corresponding digital key dip status 61, such that the actuator 10 can provide the proper proportional action to the pallet 12. In this particular embodiment, the communication unit 62 relays the digital key dip statuses 61 in accordance with, for example, the RS-485 data transmission standard, so that the digital key dip statuses 61 are relayed via a serial numerical link 69 to the actuators via their respective controllers 64. In an embodiment, each controller 64 can be mounted on a corresponding PCB 32 (shown in FIG. 2). Each controller 64 has a micro-processor and is addressable by the link 69. It is also possible to add RF transceivers on controller 64, for data exchange purposes.

The use of a numerical serial link 69 facilitates the interconnections between the pallets and the control system. It also enables one to remotely program (or reprogram when needed) each controller associated to each organ pipe actuator. Those controllers could also be controlled by another control system via another type of serial link, as someone skilled in the art will know, which open other application possibilities for the above described electromagnet actuator and controller.

Figure 7:
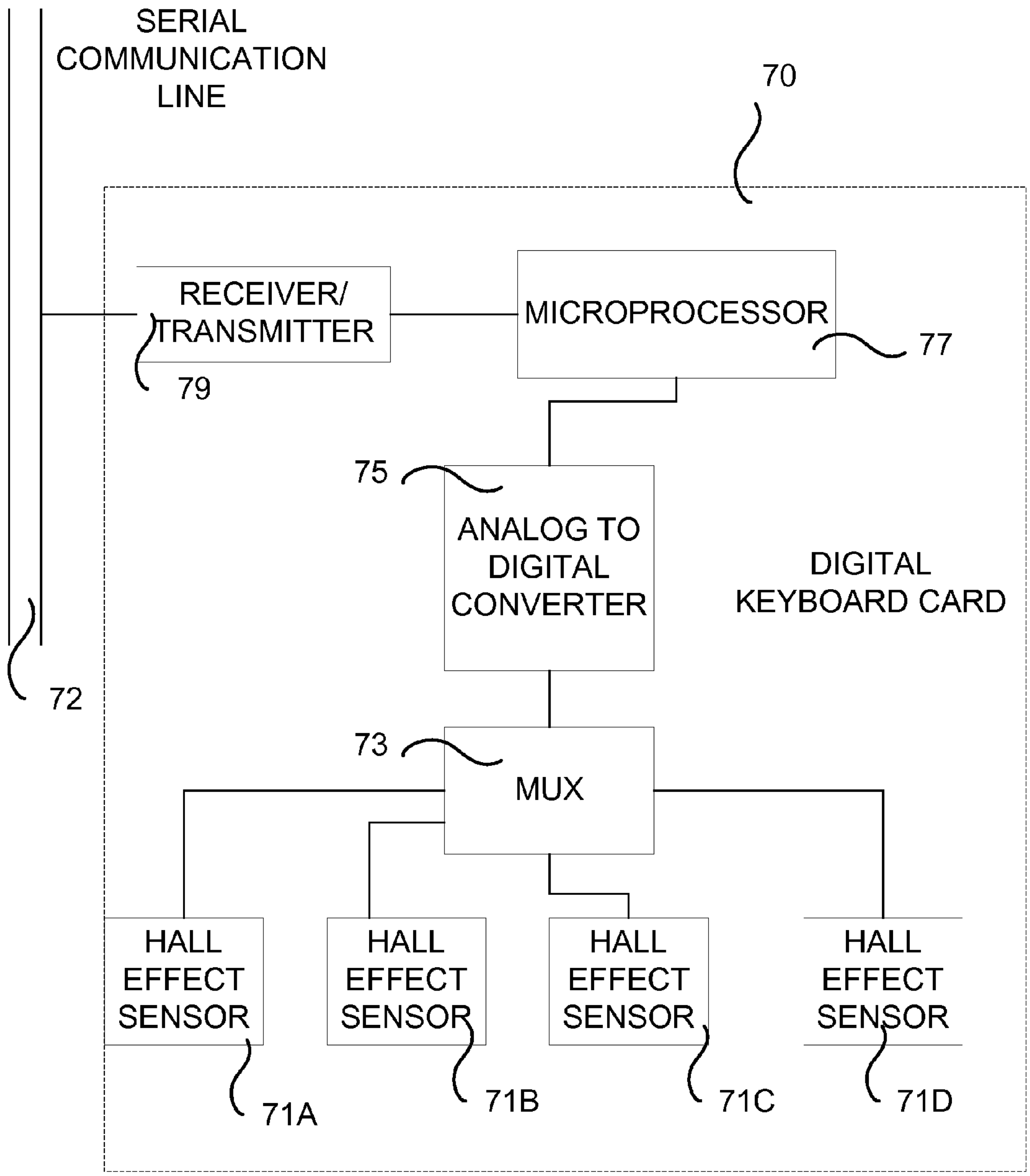
FIG. 7 is a block diagram of keyboard card according to an embodiment of the invention.

Now, with respect to FIG. 7, an alternative embodiment of a system for controlling an organ will be described. In the embodiment of FIG. 7, each keyboard has a digital keyboard card 70 associated therewith. The digital keyboard card 70 may be installed under the keys of the keyboard. In an embodiment of the present invention, the digital keyboard card 70 has 32 channels (more or less channels are also envisaged), having the ability to read the position of 32 keyboard keys. Each key has a permanent magnet installed thereon. A plurality of Hall effect sensors 71A, 71B, 71C, 71D is used to read the position of each key. The change of position of each permanent magnet produces a variation in the surrounding magnetic field that is detected by the Hall effect sensors 71. While in the embodiment of FIG. 7, only four such sensors 71 are shown, it will be understood by someone skilled in the art that for each key of the keyboard, there is a sensor 71 provided.

The digital keyboard card 70 comprises a multiplexer 73 that receives the 32 signals from the Hall effect sensors 71. In an embodiment, the 32:8 multiplexer provides, across 8 channels, the signals to an analog to digital converter 75. Other multiplexer ratios are envisaged. The sampled signals relating to the pressed keys and their position are sent by the microprocessor 77 through a receiver/transmitter unit 79 to a central processing unit (shown as numeral 83 on FIG. 8). The microprocessor unit 77 sends the information along a serial communication link 72, which, in an embodiment, is an RS-485 data transmission standard.

Figure 8:
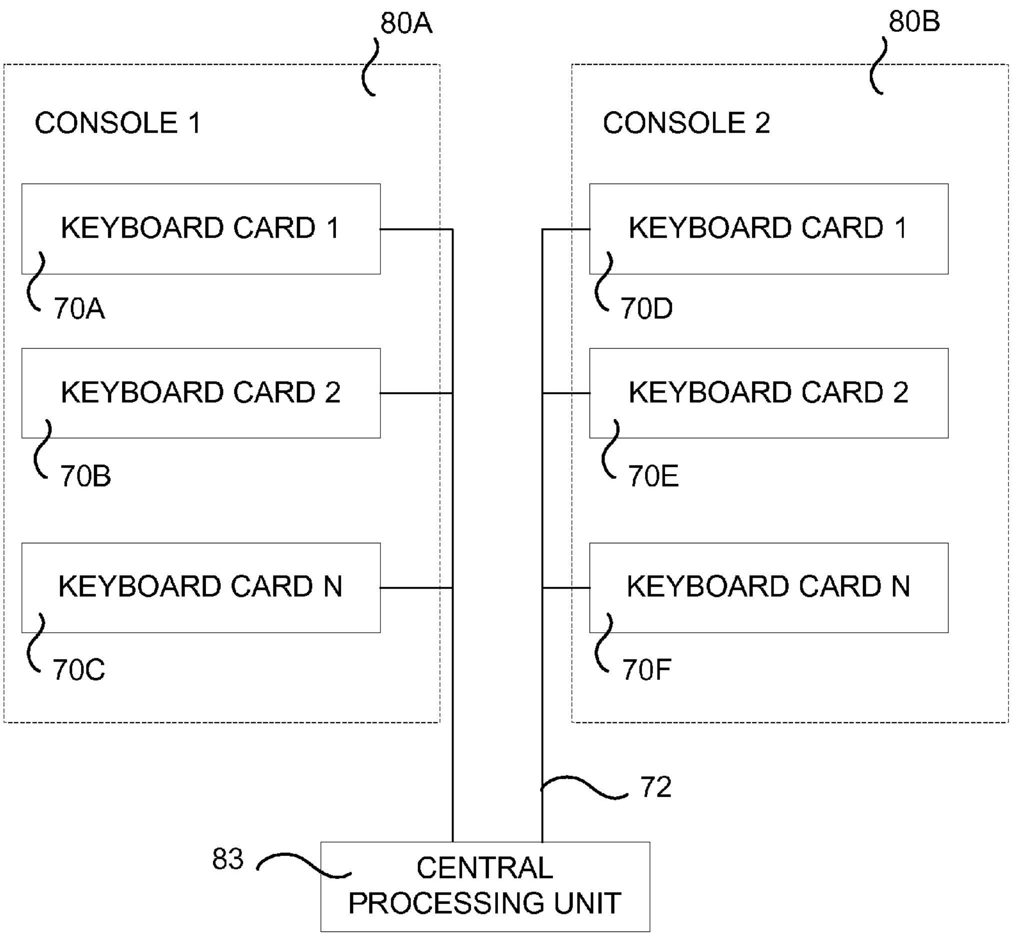
FIG. 8 is a block diagram of showing the connection of a central processing unit and a plurality of consoles according to an embodiment of the invention.

With respect to FIG. 8, the digitalization and serialization of information through the use of the digital keyboard card 70 provides the advantage that a plurality of keyboard cards 70A, 70B, 70C, 70D, 70E, 70F, from a plurality of organs consoles 80A, 80B, can be connected simultaneously to a same central processing unit 83. Persons skilled in the art will recognize that the number of connections to the central processing unit 83 is greatly reduced in the configuration shown in FIG. 8 comparatively to a configuration where each key or each keyboard card 70 is connected directly to central processing unit 83.

Although the present invention has been described hereinabove by way of specific embodiments thereof, it can be modified, without departing from the spirit and nature of the subject invention as defined herein. The scope of the invention is therefore intended to be limited solely by the scope of the appended claims.

We claim:

1. An actuator for actuating a pallet of an organ pipe under the command of a key of an organ, the actuator comprising:
- a movable member adapted to be connected to the pallet of the organ pipe;
- a magnetic plunger, mounted on the movable member;
- an electromagnet having a gap defined therein for receiving said magnetic plunger when energized, said gap comprising a space between a magnetic north pole and a magnetic south pole of said electromagnet formed when said electromagnet is energized; and
- a controller unit to control a current in the electromagnet to provide a controlled actuation of said pallet, proportional to a key dip of said key;
- wherein when said electromagnet is energized with said current and thereby creates a magnetic circuit and the movable member is substantially external to the magnetic circuit, and wherein a magnetic field is created between said magnetic north pole and said magnetic south pole of said electromagnet, exerting a force over said magnetic plunger and thereby moving said member to actuate said pallet of the organ pipe.

2. The actuator as claimed in claim 1, further comprising biasing means for urging the movable member in a direction opposite a direction of a force exerted by said electromagnet on said member.

3. The actuator as claimed in claim 1, wherein said electromagnet and said magnetic plunger have similar cross-sections, to provide for a low reluctance magnetic circuit.

4. The actuator as claimed in claim 1, wherein said movable member comprises an arm pivotally mounted on the electromagnet.

5. The actuator as claimed in claim 4, wherein said arm comprises low permeable material.

6. The actuator as claimed in claim 5, wherein said low permeable material comprises a polymer.

7. The actuator as claimed in claim 4, wherein said controller unit comprises a sensor for measuring, as a function of time, a position of said arm to thereby provide a feedback control of said actuation.

8. The actuator as claimed in claim 4, wherein said arm further comprises a permanent magnet, and wherein said sensor comprises a Hall effect sensor used for measuring the position of the permanent magnet and hence the arm.

9. The actuator as claimed in claim 1, wherein said electromagnet comprises two coils that are connected to produce magnetic fields that add up in the electromagnet.

10. The actuator as claimed in claim 1, wherein said core comprises at least two parallel portions, wherein said at least two coils are respectively wound around each one of said at least two parallel portions, whereby each coil produces a partial magnetic field, the resulting magnetic fields are added to contribute to a total magnetic field of said electromagnet.

* * * * *